United States Patent
Dzick

(10) Patent No.: US 7,018,727 B2
(45) Date of Patent: Mar. 28, 2006

(54) TRANSPARENT PROTECTIVE LAYER FOR A BODY

(75) Inventor: Jürgen Dzick, Seelze (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/940,000

(22) Filed: Sep. 13, 2004

(65) Prior Publication Data

US 2005/0100721 A1 May 12, 2005

(30) Foreign Application Priority Data

Sep. 13, 2003 (DE) ................................ 103 42 397

(51) Int. Cl.
*B32B 19/00* (2006.01)
(52) U.S. Cl. ..................... 428/699; 428/701; 428/702
(58) Field of Classification Search ................ 428/699, 428/701, 702
See application file for complete search history.

(56) References Cited

U.S. PATENT DOCUMENTS

| | | | |
|---|---|---|---|
| 4,920,014 A | 4/1990 | Hirai et al. | 428/698 |
| 5,594,231 A | 1/1997 | Pellicori et al. | 235/462 |
| 5,687,679 A * | 11/1997 | Mullin et al. | 123/41.79 |
| 6,258,472 B1 * | 7/2001 | Neumuller et al. | 428/701 |

FOREIGN PATENT DOCUMENTS

| | | |
|---|---|---|
| DE | 10000663 | 6/2001 |
| EP | 0716170 | 12/1996 |
| EP | 0 470 644 B1 | 3/1999 |
| EP | 0 909 835 A1 | 4/1999 |
| EP | 1 094 132 A1 | 4/2001 |
| EP | 1 245 698 A2 | 10/2002 |
| WO | WO96/31995 | 10/1996 |
| WO | WO 2004/026782 | 4/2004 |
| WO | WO 2004/026785 | 4/2004 |
| WO | WO 2004/026786 | 4/2004 |

* cited by examiner

*Primary Examiner*—Rena Dye
*Assistant Examiner*—Timothy M. Speer
(74) *Attorney, Agent, or Firm*—Ohlandt, Greeley, Ruggiero & Perle, L.L.P.

(57) ABSTRACT

The invention relates to a transparent protective layer, in particular a scratchproof layer for glass and glass-ceramic, which is able to withstand high temperatures, has a smooth and dense surface, an attractive surface design and is preferably used for coating cooking plates. A protective layer according to the invention comprises at least one crystalline metal oxide layer which has at least one interlayer formed from an amorphous, thermally stable mixed oxide, the interlayer being arranged being sublayers of the metal oxide layer. A further protective layer according to the invention comprises at least one amorphous, thermally stable mixed oxide layer which has at least one interlayer formed from a crystalline metal oxide, the interlayer being arranged between the sublayers of the amorphous mixed oxide layer. The amorphous mixed oxide layer has at least two metallic components. The crystalline metal oxide layers preferably consist of yttrium-stabilized zirconium oxide, and the amorphous mixed oxide layers preferably consist of titanium/aluminum oxide.

37 Claims, 3 Drawing Sheets

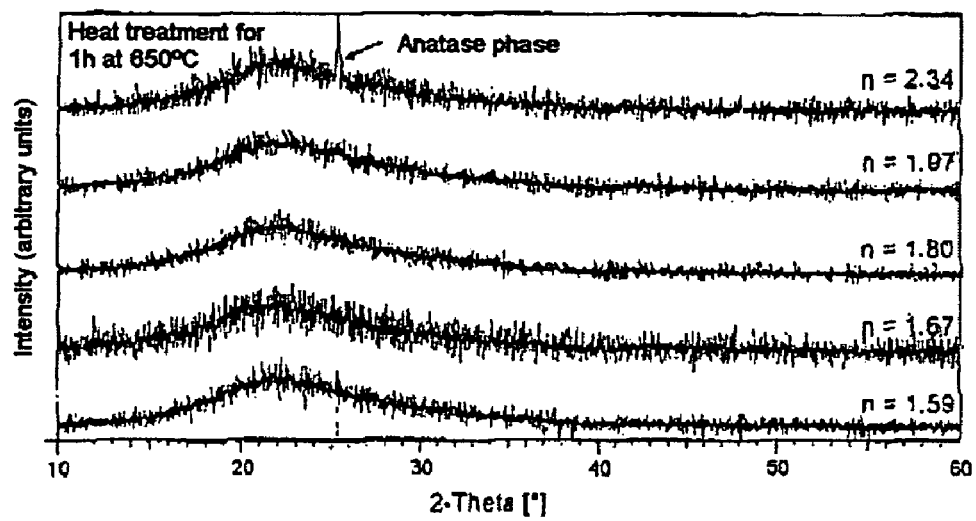
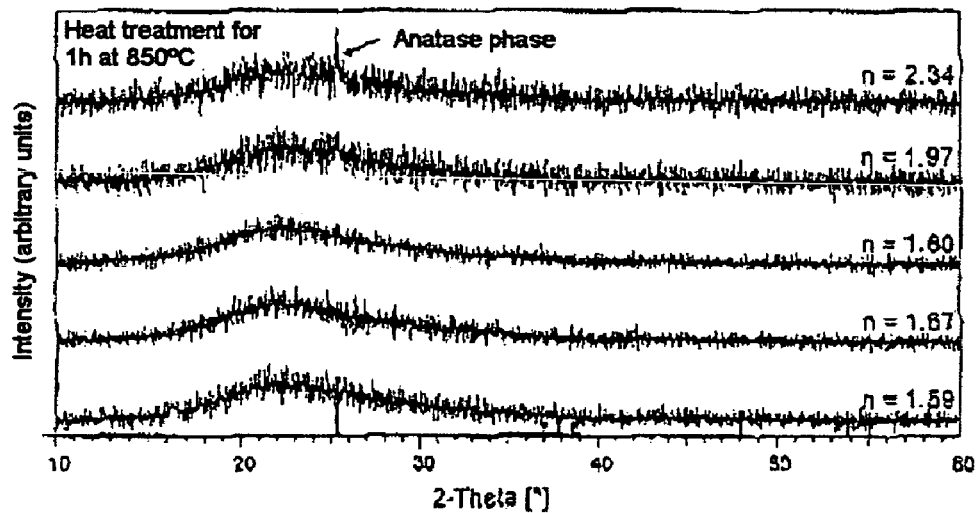
Fig. 4
| Ti [Atom%] | Al [Atom%] | Ti:Al | n |
|---|---|---|---|
| 3.76 | 0.98 | 3.84:1 | 2.34 |
| 2.83 | 3.98 | 1:1.41 | 1.97 |
| 2.24 | 6.5 | 1:2.9 | 1.8 |
| 1.85 | 8.95 | 1:4.84 | 1.67 |
| 0.57 | 13.13 | 1:23 | 1.587 |
Fig. 5

TRANSPARENT PROTECTIVE LAYER FOR A BODY

CROSS REFERENCE TO RELATED PATENT APPLICATIONS

This patent application claims priority to German Patent Application No.: DE 103 42 397.4-45 filed on Sep. 13, 2003.

BACKGROUND OF THE INVENTION

1. Field of the Invention

The invention relates to a transparent protective layer, in particular to a transparent hard-material layer with a high resistance to scratching and a high thermal stability.

The invention relates specifically to a protective layer for glass-ceramic plates, and to a process and apparatus for coating them, these glass-ceramic plates preferably being used as cooking plates in cooking hobs and having a protective layer with a higher scratch resistance than the uncoated glass-ceramic on at least one side.

2. Description of Related Art

Modern cooking hobs have a glass-ceramic plate as the cooking plate, the glass-ceramic plate typically being planar, although it may also be deformed in two or three dimensions. Glass-ceramic plates are both known from printed literature and commercially available, either in undecorated form or decorated with thermally stable colors, e.g. ceramic colors. The cooking plate has individual cooking zones which are heated inductively, by electrically operated radiant heaters, by gas radiant heating elements or by alternative heating systems (for example DHS produced by SCHOTT).

Glass-ceramic plates typically have a Mohs hardness of from 5–6, which is comparable to that of steel, from which cookware is typically produced. Everyday use, for example the cookware being put down and moved around, and the cooking plates being cleaned with abrasive cleaning agents and sponges or with a scraper, imposes a high mechanical loading on the cooking hob, which can lead to traces of use being produced on the hob.

In addition, the cooking plate is often also used as an additional work surface in the cold state. In particular in this state, there is a high risk of surface damage forming, for example through damage caused by rough bases of ceramic objects. All the surface damage incurred, over the course of time, leads to the formation of scratches on the surface, which are more or less noticeable to the user depending on the selected illumination. An additional factor is that damage to the surface offers points of attack for soiling. The ease of cleaning of the surface becomes restricted, since it is much more difficult to clean dirt out of this damage. This effect is independent of whether the cooking hob is transparent, colored or translucent.

The glass-ceramic plates of previous generations had a typical surface structure which was similar to orange peel. Although these plates were also scratched as a result of the phenomena described above, they had a relatively low susceptibility to scratches on account of the additional surface structure. However, over the course of time, the surfaces of glass-ceramic plates have become smoother and shinier, which for the reasons mentioned above leads to an increased susceptibility to scratching.

EP 0 716 270 B1 describes a cooking plate formed from glass-ceramic, on the top side of which a décor is provided, this cooking plate, in order to avoid scratches and traces of use, having a protective layer in the form of enamel fluxes or a silicate coating with a higher scratch resistance than glass-ceramic, with this protective layer covering the glass-ceramic cooking plate continuously or as continuously as possible, and a décor being printed onto this protective layer or directly onto the glass-ceramic surface. It is preferable for the protective layer to be formed from a dark material. Although this protective layer in principle increases the mechanical load-bearing capacity of the glass-ceramic cooking plates, so that, when the cooking plate is in use the susceptibility to scratches can be reduced compared to an unprotected cooking plate, the enamel fluxes or silicate protective layers which are all that is disclosed by the EP document still do not offer optimum long-term mechanical protection. Specifically, one drawback is that the protective layer itself represents a décor which is applied by means of screen printing. These décor colors are generally based on the same fluxes as the décor colors used for optical design purposes. Therefore, they are subject to the same restrictions in terms of abrasion. The minimum dimension of décors of this type is of the order of magnitude of 0.5 mm, which is in any event visually perceptible and therefore interferes with the design, in particular if glasses or glass-ceramics with smooth surfaces are desired.

Furthermore, the explanations given do not allow any conclusions to be drawn as to the extent to which the proposed solution is compatible with the heater systems used. In particular the use of preferably dark materials as protective layer for glass-ceramics with a high IR transparency and radiant heaters will lead to restrictions in terms of the desired IR transparency and therefore to losses in terms of the initial cooking performance.

DE 100 00 663 A1 describes a process and the associated apparatus for providing an optically transparent body with a scratch-resistant layer of $Al_2O_3$ over the entire surface by means of a modified PICVD process, in such a manner that a hard-material layer is formed, since it has been found that the known processes cannot be used to produce a sufficiently hard, dense, scratch-resistant and thermally stable layer, in particular from aluminum oxide. One drawback is the high cost of the process, in particular if large-area coatings have to be applied homogeneously. Hitherto, inhomogeneities have been inevitable, and this moreover has a long-term adverse effect on the visual appearance.

Furthermore, WO 96/31995 describes an inductively heated glass or glass-ceramic cooking plate with integrated coils to which a hard-material layer of $Al_2O_3$ is applied by means of the plasma spraying technique, in a layer thickness of between 50 and 200 µm. One drawback in this context is that such thick layers are very rough, and therefore the use properties, such as the abrasion caused by pots and pans, manual abrasion and the cleaning properties are adversely affected. Furthermore, the appearance of the cooking plates having a layer of this type changes completely. The surface appears matt and gray.

Furthermore, it is known from DE 42 01 914 A1 (=U.S. Pat. No. 5,594,231) to provide scanning windows made from glass or glass-ceramic for scanning systems, installed in tills in supermarkets and other retail markets, for recording bar codes applied to the packaging of goods with a transparent hard-material layer on the top side, and then for a transparent coating with sliding properties to be provided on the hard-material layer, to make this scanning window more resistant to wear. Materials which are mentioned as being suitable for the hard-material layer include metal oxides, such $Al_2O_3$, $ZrO_2$, $SnO_2$, $Y_2O_3$. Aluminum oxide which is deposited in amorphous form is referred to as being particularly suitable. In particular the amorphous deposition of the metal oxide in this context promotes the desired improved hardness and sliding properties of the protective layer. The hard-material layers described here are suitable for applications in the room temperature range, but their properties change at high temperatures, as are customary, for example, in the case of cooking plates, making them unsuitable for use at high temperatures. A protective layer for cooking surfaces requires materials which are able to withstand temperatures of up to 800° C. and which are also able to tolerate the high thermomechanical stresses which occur between the glass-ceramic and the protective layer.

DE 201 06 167 U1 has disclosed a cooking hob with a glass-ceramic plate as cooking plate, this plate being provided with a transparent scratchproof layer which may be formed, inter alia, by a hard-material layer. Metal oxides, such as aluminum oxide, zirconium oxide, yttrium oxide, tin oxide, indium oxide and combinations thereof, are among the materials mentioned for this transparent layer. According to this document, the materials can be deposited, for example, using the sol gel technique, the CVD processes, in particular by means of the PICVD process, and by sputtering.

With the known processes for producing hard-material layers, such as for example those described in the above-mentioned documents DE 42 01 914 A1 and DE 201 06 167 U1, the layers are typically deposited in an amorphous or partially crystalline structure. After prolonged use in the hot areas, or in the event of maximum thermal loading, layers of this type may undergo disadvantageous changes. For example, in these areas the layers may become discolored as a result of thermally induced compacting or may be opacified through crystallization, with the result that the hot areas become optically perceptible. Furthermore, roughening in the range from 1 to 1000 nm may occur. The roughening alone may be optically perceptible, and the recesses which form additionally make cleaning more difficult. The problem of crystallization in the hot areas is exacerbated by mechanical failure of the scratchproof layer. During crystallization, the structure of the layer changes, with the result that cracks are formed in the layer. The loss of lateral cohesion means that the layer no longer offers any particular protection against scratching.

In order, for example, to impart a higher thermal stability to zirconium oxide, it is known (G. Wehl et al., Proc. CVD-VII, 536 (1979)) to add what are known as stabilizers formed from yttrium oxide, magnesium oxide or calcium oxide to this component. However, a layer of this type, produced using the known processes, has a low density, which means that a layer of this type is porous.

The process described in U.S. Pat. No. 4,920,014 for producing a layer of this type from stabilized zirconium oxide attempts to solve this problem by the layer being deposited in such a way, by means of the CVD process and accurately set process parameters, such as temperature of the substrate, instant and duration of the supply of the reaction substances, etc., that it has only one or two crystal planes oriented parallel to the substrate surface. In addition to entailing very high process costs, crystalline layers of this type still have a rough surface.

It is known from the field of turbine technology that layers grown in column form have a particularly high resistance to rapid fluctuating thermal loads. For example, U.S. Pat. No. 4,321,311 describes the use of a ceramic layer which is grown in columnar form as thermal protection for metallic components used in turbine manufacture. However, on account of their coarse crystalline structures, the layers described in this document have a high roughness or porosity.

Rough and porous surfaces quickly become dirty and are difficult to clean. Moreover, they are not visually clear and transparent, but rather are highly diffractive and are unsuitable for applications with visually attractive surfaces.

The scratch resistance problems encountered with other optically transparent bodies formed from glass or glass-ceramic which are exposed to high use temperatures, for example chimney viewing windows, oven windows for pyrolysis ovens, etc., are similar to those encountered with cooking plates.

BRIEF SUMMARY OF THE INVENTION

The invention is based on the object of providing a transparent protective layer for bodies which is scratchproof and wear-resistant, is able to withstand long-term high thermal loads of up to 800° C. and has a permanently smooth and visually attractive surface.

The term transparent is to be understood as meaning protective layers which transmit or partially transmit radiation from the electromagnetic spectrum in the IR and visible regions of optical radiation, preferably in the range from approx. 200 nm to 3 µm.

This object is achieved by a protective layer.

According to the invention, for this purpose a transparent protective layer for a body; which comprises at least one hard-material layer, has at least one hard-material layer which comprises a crystalline metal oxide and includes at least one interlayer formed from an amorphous, thermally stable mixed oxide, the mixed oxide comprising a metal oxide with at least two metallic components, and the interlayer being arranged between sublayers of the hard-material layer comprising crystalline metal oxide.

According to the invention, a further transparent protective layer for a body, which comprises at least one hard-material layer, for this purpose includes at least one hard-material layer which comprises an amorphous, thermally stable mixed oxide, with at least one interlayer formed from a crystalline metal oxide, the mixed oxide comprising a metal oxide with at least two metallic components, and the interlayer being arranged between sublayers of the hard-material layer comprising amorphous, thermally stable mixed oxide.

According to the invention, a further transparent protective layer for a body, which comprises at least one hard-material layer, for this purpose includes at least two sublayers, a first sublayer comprising an amorphous, thermally stable mixed oxide with at least two metallic components, and a second sublayer comprising crystalline metal oxide.

Typical layer thicknesses for scratchproof/hard-material layers are in the range from 100 to 20000 nm, and in the case of coatings for glass and glass-ceramic are in the range between 1500 and 5000 nm.

If scratchproof/hard-material layers of this type, which are distinguished by their predominantly crystalline nature and morphology (described below as the "crystalline morphology"), are interrupted by amorphous interlayers formed from thermally stable mixed oxides, in particular by interlayers with a thickness in the range from 10 to 500 nm, preferably in the range from 50 to 300 nm, layer-intrinsic stresses are compensated, and moreover dense layer surfaces are produced; the term amorphous layers is to be understood as meaning layers with a predominantly amorphous structure.

Analogously, scratchproof/hard-material layers which are distinguished by their "amorphous morphology" can be interrupted by crystalline interlayers formed from metal oxides, in particular by interlayers with a thickness in the range from 10 to 500 nm, preferably in the range from 50 to 300 nm, so that in this case too layer-intrinsic stresses are compensated and moreover it is possible to produce dense layer surfaces.

The same effect is also achieved simply by hard-material layers which comprise at least two sublayers, of which one sublayer consists of a crystalline metal oxide with a so-called crystalline morphology and a further sublayer consists of an amorphous, thermally stable mixed oxide.

The thickness of the sublayers of all the protective layers according to the invention which have been mentioned is advantageously in the range from 10 to 500 nm, preferably in the range from 50 to 300 nm.

Protective layers of this type have a long service life even in the event of prolonged high operating temperatures, as typically occur, for example, with cooking plates. Neither clouding nor crack formation occurs. The dense morphology of the layers makes such layers highly scratchproof, allows substantially unimpeded optical transmission and avoids interfering effects caused by light scattering.

An increased thermal stability is achieved if the layers formed from crystalline metal oxide comprise a metal oxide in a thermally, stable crystal phase. For this purpose, these layers may, for example, comprise aluminum oxide or zirconium oxide in thermally stable crystal phases.

It has been discovered that layers according to the invention, in particular having hard-material layers formed from zirconium oxide in a thermally stable crystal phase and interlayers formed from titanium/aluminum oxide, are especially suitable for transparent, highly thermally stable protective layers with a particularly attractive visual appearance. The interlayer produces a particularly thermally stable, dense morphology for the hard-material layer which, moreover, is highly scratch-resistant. It is advantageous in this context that the zirconium oxide layers can be stabilized in a high-temperature crystal phase by addition of other metal oxides, such as yttrium oxide, calcium oxide, magnesium oxide, tantalum oxide, niobium oxide, scandium oxide, titanium oxide or combinations thereof, but in particular by the addition of 0.5 to 50 mol % of $Y_2O_3$ advantageously by the addition of 0.5 to 10 mol % of $Y_2O_3$, and particularly optimally by the addition of 4 mol % of $Y_2O_3$ in such a manner that they do not experience any temperature-dependent structural changes at least in the temperature range which is of relevance to cooking systems (up to at most 800° C.).

Furthermore, it is in this context advantageous that certain mixed metal oxides, in particular titanium/aluminum oxide, retain their amorphous structure even under high-thermal loads and are therefore particularly suitable for use as an amorphous layer in combination with layers having a so-called crystalline morphology.

Layer combinations of this type make the protective layer particularly insensitive to mechanical and thermal loads.

However, in addition to titanium/aluminum oxide, it is also possible for other thermally stable mixed oxides, having at least two metallic components selected from the group of elements consisting of Li, Be, Na, Mg, Al, Si, Ca, Sc, Ti, Cr, Zn, Ge, Sr, Y, Zr, Nb, Cd, In, Sn, Sb, Te, La, Ce, Pr, Nd, Sm, Gd, Yb, Lu, Hf, Ta, Tl, Pb, Bi and/or Th to be used as material for the amorphous layers.

If the interlayers are as far as possible not to influence the optical impression and the transparency of the protective layer, the interlayer may have approximately the same refractive index as the sublayers of the hard-material layer. However, it is also possible for example in order to achieve an altered optical impression, to select layers with different refractive indices. In this context, there are numerous possible options provided by the use of suitable combinations of materials but also by varying the refractive index of the layer comprising an amorphous, thermally stable mixed oxide by means of the quantitative ratio of the metallic components.

If, by way of example, stabilized zirconium oxide is selected for the hard-material layer, with a refractive index of approx. 2.1, and $Ti_xAl_{1-x}O_y$, where $0<x<1$, in which the refractive index can be set in the range from $1.55 \leq n \leq 2.50$ by setting a specific quantitative ratio of titanium to aluminum, it is possible to produce both an interlayer with a matching refractive index which has no influence on the visual appearance and an interlayer with a differing refractive index, which allows designing of the optical appearance within predetermined boundaries. Therefore, working on the basis of an optimized layer structure, it is possible, while maintaining the optimized mechanical properties, to produce different visual appearances for an optimum protective layer for different application areas and/or customers by varying the quantitative ratio of titanium to aluminum slightly.

A further transparent protective layer according to the invention for a body likewise has at least one hard-material layer, the latter comprising at least two sublayers, with one sublayer comprising silicon nitride and the other sublayer comprising an amorphous, thermally stable mixed oxide.

In this case too, the layer-intrinsic stresses in the hard-material layer are compensated, and moreover dense layer surfaces are produced. The statements given above in connection with the layers formed from amorphous, thermally stable mixed oxides also apply accordingly to their use in combination with sublayers formed from silicon nitride.

In addition to the hard-material layer, which includes at least two sublayers in accordance with the statements given above, the transparent protective layer may also include one or more further transparent hard-material layers, preferably formed from a metal oxide or silicon nitride. These further transparent hard-material layers do not necessarily also have to include sublayers and may, for example, consist of the same amorphous, thermally stable mixed oxide or the same crystalline metal oxide as an interlayer and/or sublayer.

The bodies to be coated may additionally be decorated above, below or within the protective layer.

Transparent protective layers according to the invention have very dense and smooth surfaces, and the roughness of the surfaces has an $R_a$ value of <50 nm, in a preferred embodiment an $R_a$ value of <30 nm, and particularly preferably an $R_a$ value of <20 nm.

Furthermore, it may be desirable to achieve a particularly high surface quality for the coated body. For this purpose, the surface can be remachined once again in one or more polishing steps which are suitable for improving the small remaining surface roughness down to an $R_a$ value of 1 nm.

Transparent protective layers according to the invention can be produced using CVD or PVD processes, but reactive PVD processes or reactive ion beam-assisted PVD processes, in particular reactive sputtering processes or reactive ion beam-assisted sputtering processes, are preferably suitable for the production of crystalline metal oxide layers. Reactive magnetron sputtering processes are most suitable for industrial coating operations.

The protective layers according to the invention are suitable for coating a very wide range of bodies which in particular need to have a high resistance to scratching and a high thermal stability. Furthermore, they allow an attractive visual appearance and transparency to be achieved. They are particularly suitable for use as protective layers for glass, glass-ceramic or bodies formed from other non-metallic, crystalline materials, without being restricted to these specific applications. It is thus also possible to coat plastic bodies, for example in order to improve the surface quality and barrier properties of plastics containers.

The protective layer is particularly advantageously suitable for the coating of glass-ceramic cooking plates. A high resistance to scratching, a high thermal stability and a visually attractive appearance are crucial requirements for this application which can be fulfilled by the coating according to the invention.

BRIEF DESCRIPTION OF THE SEVERAL VIEWS OF THE DRAWINGS

The invention is to be explained in more detail below on the basis of exemplary embodiments. In the drawing:

FIG. 4: shows the diffractograms of titanium/aluminum oxide layers with different refractive indices after heat treatments at 650° C. and 850° C., FIG. 5: shows a summary in table form of the quantitative ratios of Al:Ti for the diffractograms of titanium/aluminum oxide layers illustrated in FIG. 3.

DETAILED DESCRIPTION OF THE INVENTION

Figure 1:
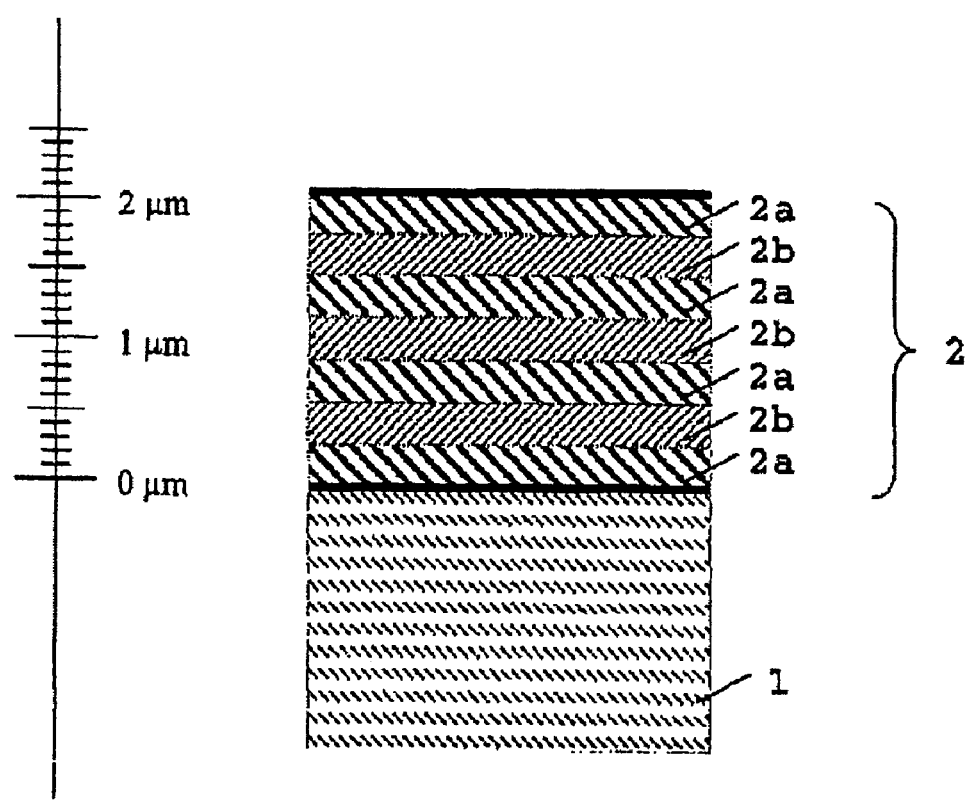
FIG. 1: shows a substrate having a transparent protective layer with a hard-material layer.
Figure 2:
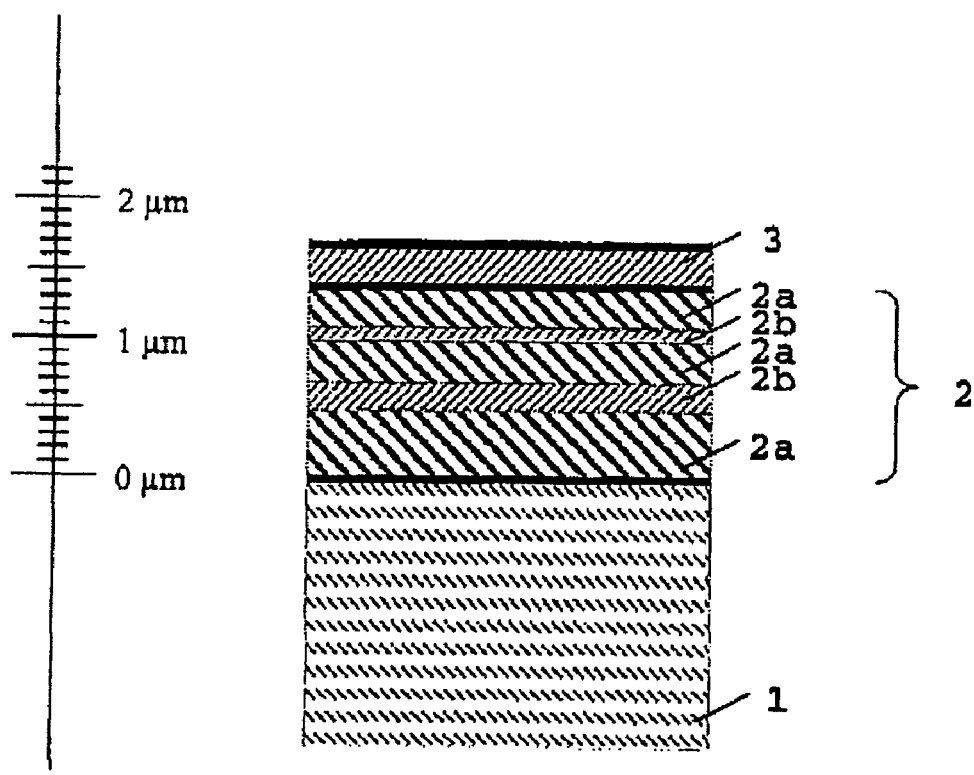
FIG. 2: shows a substrate having a transparent protective layer with two hard-material layers.
Figure 3:
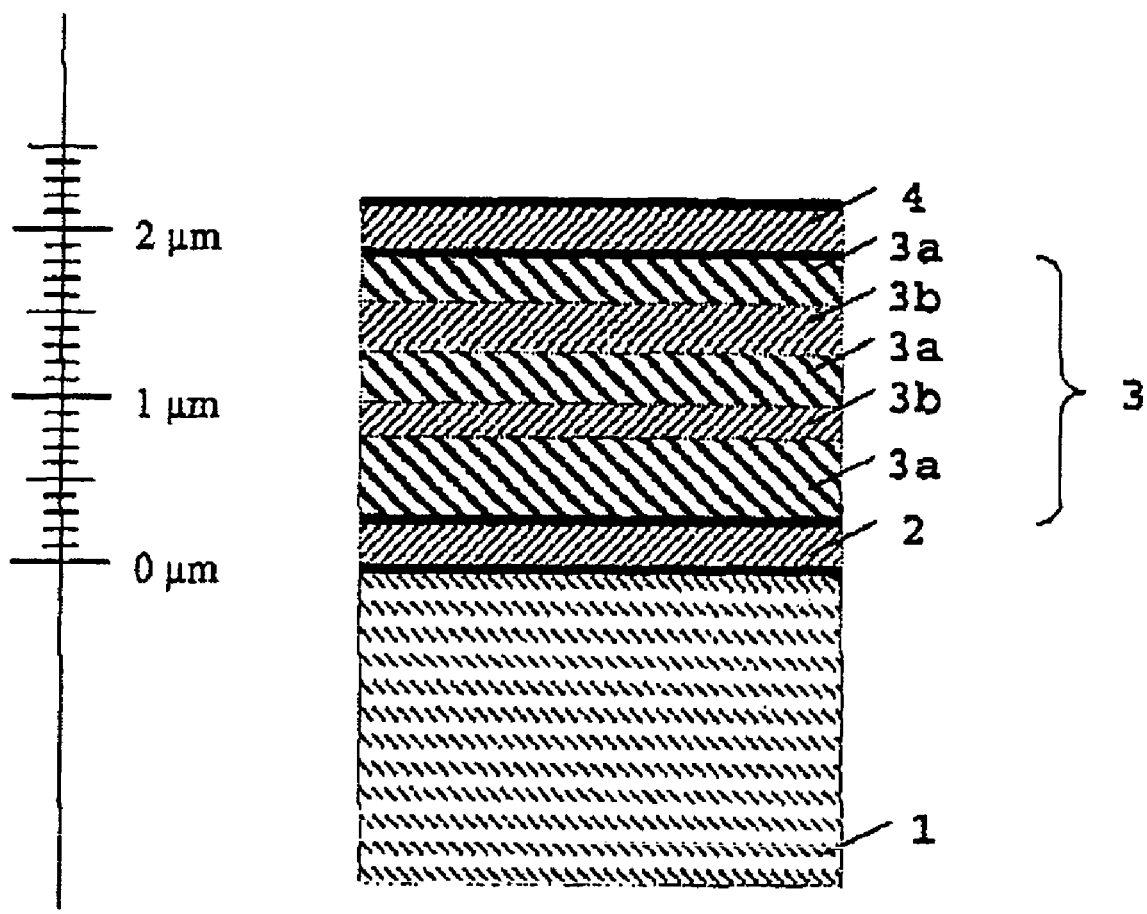
FIG. 3: shows a substrate having a transparent protective layer with three hard-material layers.

FIGS. 1 to 3 diagrammatically depict possible variants of protective layers according to the invention for coating substrates (1). The invention is not restricted to these which cannot all be explained in detail.

In FIG. 1, a substrate (1) is coated with a hard-material layer (2). The hard-material layer (2) has three interlayers (2b) formed from amorphous titanium/aluminum oxide. The interlayers (2b) are arranged between four sublayers (2a) formed from crystalline, yttrium-stabilized zirconium oxide. The layer thickness of the interlayers (2b) and sublayers (2a) is in each case 300 nm, and the total layer thickness of the hard-material layer (2) is 2100 nm.

In FIG. 2, a substrate (1) is coated with two hard-material layers (2, 3). The first hard-material layer (2) includes two interlayers (2b) formed from amorphous titanium/aluminum oxide, the interlayer (2b) having different layer thicknesses (200 nm and 100 nm). The interlayers (2b) are arranged between three sublayers (2a) formed from crystalline, yttrium-stabilized zirconium oxide, the three sublayers (2a) having thicknesses of 500 nm, 300 nm, and 300 nm. The total layer thickness of the first hard-material layer (2) is 1400 nm. The second hard-material layer (3) is an individual layer formed from amorphous titanium/aluminum oxide and has a thickness of 300 nm.

In FIG. 3, a substrate (1) is coated with three hard-material layers (2, 3 and 4). The first hard-material layer (2) is an individual layer formed from amorphous titanium/aluminum oxide and has a thickness of 300 nm. The second hard-material layer. (3) includes two interlayers (3b) formed from amorphous titanium/aluminum oxide, the interlayer (3b) having differing layer thicknesses (200 nm and 300 nm). The interlayers (3b) are arranged between three sublayers (3a) formed from crystalline, yttrium-stabilized zirconium oxide, the three sublayers (3a) having thicknesses of 500 nm, 300 nm and 300 nm. The total layer thickness of the second hard-material layer (3) is 1600 nm. The third hard-material layer (4) is likewise an individual layer which consists of amorphous titanium/aluminum oxide or silicon nitride and has a thickness of 300 nm.

Furthermore, the properties of an interlayer according to the invention formed from an amorphous, thermally stable mixed oxide with at least two metallic components, in this case specifically titanium/aluminum oxide, were investigated.

For this purpose, substrates were coated with in each case one $Ti_xAl_{1-x}O_y$ individual layer (0<x<1) with a layer thickness of 500 nm.

To vary the refractive index between the minimum and maximum possible values of $1.55 \leq n \leq 2.50$, different quantitative proportions of aluminum and titanium were set during the coating process. The ratios established in the layers were measured by means of EDX. The respective quantitative ratio can be determined from the measured proportions in at %. The individual values for the quantitative proportions in at % of titanium and aluminum, the associated quantitative ratio of Ti:Al and the corresponding refractive indices are given in the overview provided in FIG. 5.

An increase in the aluminum content reduces the refractive index n of the layer.

Then, the coated substrates were subjected to a heat treatment at 650° C. or 850° C. for 1 hour.

The X-ray examinations of the individual specimens following the heat treatment at 650° C. or 850° C. illustrated in FIG. 4 reveal that only in each case the layer with the lowest aluminum content, with n=2.34, is susceptible to the formation of the anatase phase. However, even small quantities of aluminum are sufficient to prevent the formation of crystals under high-temperature loads. None of the layers examined revealed any clouding phenomena.

This shows that these interlayers are thermally stable, amorphous layers and are suitable for protective layers according to the invention. They can preferably be used in the high-temperature range, since they remain structurally stable even under extreme thermal loading of more than 600° C. and do not present any clouding.

The invention claimed is:

1. A transparent protective layer for use on a body, comprising:
   at least one hard-material layer, wherein said at least one hard-material layer has a crystalline metal oxide, said at least one hard-material layer having said crystalline metal oxide with at least one interlayer, said at least one interlayer formed from an amorphous, thermally stable mixed oxide, said amorphous, thermally stable mixed oxide having a metal oxide, said metal oxide having at least two metallic components, wherein said at least one interlayer is formed from said amorphous, thermally stable mixed oxide being arranged between at least two sublayers of the at least one hard-material layer with said crystalline metal oxide.

2. A transparent protective layer for use on a body, which comprises:
   at least one hard-material layer, wherein said at least one hard-material layer comprises an amorphous, thermally stable mixed oxide, said at least one hard-material layer having said amorphous, thermally stable mixed oxide with at least one interlayer formed from a crystalline metal oxide, said amorphous, thermally stable mixed oxide having a metal oxide with at least two metallic components, said at least one interlayer formed from said crystalline metal oxide being arranged between sublayers of said at least one hard-material layer having said amorphous, thermally stable mixed oxide.

3. A transparent protective layer for use on a body which comprises at least one hard-material layer, wherein said at least one hard-material layer has at least two sublayers, a first sublayer of said at least two sublayers having an amorphous, thermally stable mixed oxide and at least two metallic components, a second sublayer of said at least two sublayers having a crystalline metal oxide.

4. The transparent protective layer as claimed in claim 1, wherein said hard-material layer has a thickness in a range of between 100 to 20,000 nm.

5. The transparent protective layer as claimed in claim 4, wherein said thickness is in a range from 10 to 500 nm.

6. The transparent protective layer as claimed in claim 1, wherein said hard-material layer has a thickness is in a range from 10 to 500 nm.

7. The transparent protective layer as claimed in claim 1, wherein said at least two sublayers have said crystalline metal oxide with said metal oxide in a thermally stable crystal phase.

8. The transparent protective layer as claimed in claim 7, wherein said at least two sublayers have said crystalline metal oxide, which comprises aluminum oxide in a thermally stable crystal phase.

9. The transparent protective layer as claimed in claim 7, wherein said at least two sublayers have said crystalline metal oxide, which comprises zirconium oxide in a thermally stable crystal phase.

10. The transparent protective layer as claimed in claim 9, further comprising a component admixed to said zirconium oxide to stabilize said thermally stable crystal phase.

11. The transparent protective layer as claimed in claim 10, wherein said component is selected from the group consisting of an oxide, a combination of oxides, yttrium oxide, calcium oxide, magnesium oxide, tantalum oxide, niobium oxide, scandium oxide, titanium oxide, an oxide from the group of the lanthanoid oxides, lanthanum oxide, and cerium oxide.

12. The transparent protective layer as claimed in claim 9, wherein said at least two sublayers are said zirconium oxide, and wherein said at least one interlayer is said zirconium oxide with hafnium oxide.

13. The transparent protective layer as claimed in claim 11, wherein said at least two sublayers are said zirconium oxide, and wherein said at least one interlayer is said zirconium oxide with said component consisting of from 0.5 to 50 mol % of $Y_2O_3$.

14. The transparent protective layer as claimed in claim 13, wherein said at least two sublayers are said zirconium oxide, and wherein said at least one interlayer is said zirconium oxide with 4 mol % (±1 mol %) of $Y_2O_3$ as said component.

15. A transparent protective layer for use on a body which comprises at least one hard-material layer, wherein said at least one hard-material layer has at least two sublayers with a first sublayer having an amorphous, thermally stable mixed oxide with at least two metallic components and a second sublayer with silicon nitride.

16. The transparent protective layer as claimed in claim 1, wherein at least one sublayer of said at least two sublayers has said amorphous, thermally stable mixed oxide with approximately a same refractive index as a second sublayer of the at least two sublayers with said crystalline metal oxide.

17. The transparent protective layer as claimed in claim 16, wherein said refractive index n of said at least one interlayer has said amorphous, thermally stable mixed oxide, and wherein at least one sublayer of said at least two sublayers has said amorphous, thermally stable mixed oxide varied using a quantitative ratio of said at least two metallic components.

18. The transparent protective layer as claimed in claim 1, wherein said at least one interlayer has said amorphous, thermally stable mixed oxide, and wherein at least one sublayer of said at least two sublayers has said amorphous, thermally stable mixed oxide with said at least two metallic components selected from the group consisting of Li, Be, Na, Mg, Al, Si, Ca, Sc, Ti, Cr, Zn, Ge, Sr, Y, Zr, Nb, Cd, In, Sn, Sb, Te, La, Ce, Pr, Nd, Sm, Gd, Yb, Lu, Hf, Ta, Tl, Pb, Bi, and Th.

19. The transparent protective layer as claimed in claim 17, wherein said at least one interlayer has said amorphous, thermally stable mixed oxide, and wherein at least one sublayer of said at least two sublayers has said amorphous, thermally stable mixed oxide with a titanium/aluminum oxide.

20. The transparent protective layer as claimed in claim 19, wherein said titanium/aluminum oxide is $Ti_xAl_{1-x}O_y$, where $0<x<1$.

21. The transparent protective layer as claimed in claim 20, wherein said refractive index n of said titanium/aluminum oxide is set in a range between $1.55 \leq n \leq 2.50$ by a titanium to aluminum quantitative ratio.

22. The transparent protective layer as claimed in claim 1, further comprising a further transparent hard-material layer.

23. The transparent protective layer as claimed in claim 22, wherein said transparent hard-material layer has said amorphous, thermally stable mixed oxide, with said at least two metallic components.

24. The transparent protective layer as claimed in claim 23, wherein said transparent hard-material layer has the same components as said at least one interlayer and has the same components as at least one sublayer of said at least two sublayers.

25. The transparent protective layer as claimed in claim 22, wherein said transparent hard-material layer is said crystalline metal oxide.

26. The transparent protective layer as claimed in claim 25, wherein said transparent hard-material layer has the same components as said at least one interlayer with said crystalline metal oxide, and wherein said transparent hard material layer has the same components as at least one sublayer of said at least two sublayers.

27. The transparent protective layer as claimed in claim 22, wherein said transparent hard-material layer has a component selected from the group consisting of silicon oxide, and aluminum oxide.

28. The transparent protective layer as claimed in claim 22, wherein said transparent hard-material layer comprises silicon nitride.

29. The transparent protective layer as claimed in claim 1, wherein the transparent protective layer has a surface roughness with an $R_a$ value of <50 nm.

30. The transparent protective layer as claimed in claim 1, wherein the transparent protective layer can be produced using a process selected from the group consisting of a CVD process, and a PVD process.

31. The transparent protective layer as claimed in claim 30, wherein the transparent protective layer is produced using a reactive PVD process.

32. The transparent protective layer as claimed in claim 31, wherein the transparent protective layer can be produced using a reactive sputtering process.

33. The transparent protective layer as claimed in claim 31, wherein the transparent protective layer forms a coating, wherein said coating is produced using a reactive ion beam-assisted PVD process.

34. The transparent protective layer as claimed in claim 33, wherein said coating is used for coating bodies made from a material selected from the group consisting of glass, glass-ceramic, non-metallic, crystalline materials, plastic bodies, and any combinations thereof.

35. The transparent protective layer as claimed in claim 1, wherein the transparent protective layer is coated on the body.

36. The transparent protective layer as claimed in claim 1, wherein the transparent protective layer is coated to a cooking hob.

37. The transparent protective layer as claimed in claim 1, wherein the transparent protective layer is coated to a cooking appliance.

* * * * *